(12) United States Patent
Russo et al.

(10) Patent No.: US 12,229,202 B2
(45) Date of Patent: Feb. 18, 2025

(54) INSPIRING DIVERGENT THINKING AND CREATIVITY VIA CURIOSITY HALO

(71) Applicant: International Business Machines Corporation, Armonk, NY (US)

(72) Inventors: Joseph Anthony Russo, Westford, MA (US); Jennifer Anne Janechek, North Liberty, IA (US); Jill Sherman, Northfield, IL (US); Jonathan Ralph, Rosemount, MN (US); Christopher P Wilczak, Chicago, IL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/214,114

(22) Filed: Jun. 26, 2023

(65) Prior Publication Data
US 2024/0427825 A1    Dec. 26, 2024

(51) Int. Cl.
G06F 16/9532    (2019.01)
G06F 16/9535    (2019.01)
G06F 16/954     (2019.01)

(52) U.S. Cl.
CPC ...... *G06F 16/9532* (2019.01); *G06F 16/9535* (2019.01); *G06F 16/954* (2019.01)

(58) Field of Classification Search
CPC . G06F 16/9532; G06F 16/9535; G06F 16/954
USPC ........ 707/706, 722, 723, 733, 748, 758, 769
See application file for complete search history.

(56) References Cited

U.S. PATENT DOCUMENTS

| | | |
|---|---|---|
| 10,007,719 B2 | 6/2018 | Horvitz et al. |
| 10,007,730 B2 | 6/2018 | Horvitz et al. |
| 10,521,420 B2 | 12/2019 | Cunico et al. |
| 11,308,096 B2 | 4/2022 | Pichaimurthy et al. |

(Continued)

FOREIGN PATENT DOCUMENTS

WO    2016090326 A1    6/2016

OTHER PUBLICATIONS

Anonymous, "System and Method to adjust internet search engine bias", An IP.com Prior Art Database Technical Disclosure, IP.com No. IPCOM000238643D, Sep. 9, 2014, 4 pages.

(Continued)

*Primary Examiner* — Phong H Nguyen
(74) *Attorney, Agent, or Firm* — Scully, Scott, Murphy & Presser, P.C.; Michael O'Keefe

(57) ABSTRACT

A recommender system and method to facilitate non-biasing search queries, social media feeds, and other platforms in which a user searches, scrolls, and engages with information and ideas so that a user can explore ideas outside of, or even contrary to, the ones with which they are aligned. Through a computer-implemented "curiosity halo" recommendation engine and method, users are made aware of the existence of other notions centered around or connected to a topic. The users could also engage to be directed to adjacent notions and "lines of flight" around the topic, thereby broadening their perspective and strengthening their ability to think "outside the box"—or bubble. By adjusting a threshold based on curiosity level and tolerance for divergent thinking, the boundaries of the curiosity halo are continually redrawn in real time so that users can dynamically uncover topics and ideas outside of their day-to-day experience.

16 Claims, 8 Drawing Sheets

(56) References Cited

U.S. PATENT DOCUMENTS

| | | | |
|---|---|---|---|
| 11,347,817 B2* | 5/2022 | Gustavson | G06F 16/9535 |
| 2007/0050393 A1* | 3/2007 | Vogel | G06F 16/951 |
| | | | 707/999.102 |
| 2011/0191290 A1* | 8/2011 | Gutlapalli | G06F 16/951 |
| | | | 707/610 |
| 2014/0280548 A1 | 9/2014 | Langlois et al. | |
| 2016/0363994 A1* | 12/2016 | Yokoya | G06F 3/0484 |
| 2017/0344663 A1 | 11/2017 | Aliakbar Tabrizi et al. | |
| 2019/0138575 A1 | 5/2019 | Toba et al. | |
| 2019/0163792 A1 | 5/2019 | Gordon et al. | |
| 2021/0281569 A1 | 9/2021 | Soon-Shiong et al. | |
| 2024/0095283 A1* | 3/2024 | Hynes | G06F 16/9038 |

OTHER PUBLICATIONS

Anonymous, "Method and System for Echo-Chamber Detection Using a User's Browsed Content", An IP.com Prior Art Database Technical Disclosure, IP.com No. IPCOM000260430D, Nov. 20, 2019, 7 pages.

Anonymous, "AI Based System to Escape from Filter Bubble", An IP.com Prior Art Database Technical Disclosure, IP.com No. IPCOM000264239D Nov. 25, 2020, 3 pages.

Debono, E., "Lateral Thinking: Creativity Step by Step", 1970, 302 pages.

Debono, E., "I Am Right—You Are Wrong", 1990, 311 pages.

Hampson, M., "Smart algorithm bursts social networks' 'filter bubbles", https://spectrum.ieee.org/finally-a-means-for-bursting-social-media-bubbles, Jan. 21, 2021, 5 pages.

Malik, A., "YouTube rolls out personalized 'New to you' feed to help users discover content", https://techcrunch.com/2021/10/25/youtube-rolls-out-personalized-new-to-you-feed-to-help-users-discover-content/, Oct. 25, 2021, 2 pages.

Seneca, C., "How to break out of your social media echo chamber", https://www.wired.com/story/facebook-twitter-echo-chamber-confirmation-bias/, Sep. 17, 2020, 13 pages.

Wang, W., et al., "User-controllable Recommendation Against Filter Bubbles", Topic 18: Recommender System, SIGIR '22, Jul. 11-15, 2022, pp. 1251-1261.

Wordpress, "A Practical Guide to Building Recommender Systems", https://buildingrecommenders.wordpress.com, Retrieved Jan. 3, 2023, 1 page.

* cited by examiner

INSPIRING DIVERGENT THINKING AND CREATIVITY VIA CURIOSITY HALO

BACKGROUND

This disclosure is directed to recommendation engines for predicting the content, product, or services customers will like, and more particularly, to a recommender system and method implementing a curiosity halo recommender model that offers a richer, more discursive search experience for users.

With the advent of social media, tagging, liking, and following, there has been a sharp rise in "bubbles" of thinking, ones that serve only to reaffirm and reinforce beliefs, ideas, and information (some of which is false or misleading). As it has been explained, the adaptive algorithms behind search engines and social media networks "[create] echo chambers in which a user is never presented with alternative perspectives" (Seneca 2020). These digital echo chambers or "filter bubbles"—states of ideological and intellectual isolation that result from users' engagement with websites and the algorithms that "personalize" their experience by limiting their exposure to differing perspectives—have served to create factions centered around topic and support homophily, the tendency of individuals to seek out and interact with other people who hold the same opinions, biases, and values.

Not only have these filter bubbles exacerbated political and ideological polarization, but they also have hampered users' ability to think beyond their limited scope, causing new ideas, creative thinking, innovative problem-solving, and general curiosity to become increasingly rare. Users' search habits and digital behaviors—and the models and networks that are scripting them—have diminished the capacity for independent thinking, empathy, imagination, and inventiveness, qualities that are crucial to the formation and maintenance of communities, the success of businesses, the progress of society, as well as personal growth and fulfillment.

While efforts to disrupt these personalization models and, by extension, the resulting filter bubbles have been implemented on a small scale, there is presently no mechanism for increasing user awareness of their search and scrolling patterns (and the biases and tendencies they reveal) and offering them a wider set of options for information consumption prior to their becoming enmeshed in a filter bubble.

SUMMARY

A computer-implemented recommender system and method implements one or more recommendation models to create a halo of information that could be used to encourage a user to step outside of their standard filter bubble. By leveraging one or more recommendation models in conjunction to create the curiosity halo, a user is offered a richer, more discursive search and engagement experience.

A computer-implemented recommender system and method implementing models to provide for a more robust user search and engagement experience by following discursive information discovery flows, allowing for bursts of creativity and perspective diversification in real time.

A computer-implemented recommender system and method that enables users to regain control over their search and scrolling habits, to enjoy a greater diversity of content, and to exhibit more playfulness and discursivity in their online searching or shopping experience or any engagement experience where things (people, content, products) can be recommended instead of becoming locked in the feedback loops that Internet algorithms reinforce.

One embodiment is a computer-implemented system and method for increasing the transparency of how content is retrieved and displayed by search engines, social media networks, and any other platform that curates content for users. The system grants users the agency to reflect on their own patterns of information consumption and to choose a journey outside their typical one—a path that opens them up to ideas, people, and perspectives more robust than the ones in their filter bubbles.

In an embodiment, there is provided a computer-implemented recommender system and method to facilitate non-biasing search queries, social media feeds, and other platforms in which a user searches, scrolls, and engages with information and ideas so that a user can explore ideas outside of, or even contrary to, the ones with which they are aligned.

A computer-implemented recommendation engine generating "curiosity halo" results through which users are made aware of the existence of other notions centered around a topic or connected to a topic. The users could also engage to be directed to adjacent notions and "lines of flight" around the topic, thereby broadening their perspective and strengthening their ability to think "outside the box"—or bubble. By adjusting their threshold based on curiosity level and tolerance for divergent thinking, the boundaries of the curiosity halo are continually redrawn in real time so that users can dynamically uncover topics and ideas outside of their day-to-day experience. That is, the system and methods are designed create an evolving set of recommendations, evolving as the user's recommendation sets change over time. In essence, this curiosity halo computation changes over time in reaction to the user's recommendations and subsequent engagement with those items presented as part of their curiosity halo (which then become part of dynamic recommendation field used to generate an evolving set of recommendations)).

According to one aspect, there is provided a computer implemented recommender method. The recommender method comprises: accessing, by a user, via a remote computer system, an on-line recommender application used to generate recommendations on a given search topic or concept; selecting, by a hardware processor, based on a user profile information, a machine-learned recommender model for use by the recommender application to search and generate search results based on the given topic or concept, the selected recommender model having one or more trained model parameter values; and running, at the hardware processor, the recommender model responsive to the one or more trained model parameter values for conducting a search and generating a halo of recommendation results, the generated halo of recommendation results comprising a dataset that expands and diversifies the content range for the given topic or concept to a degree based upon an application data set and the one or more model parameter values; and displaying, via a user interface of the computer system, the generated halo of recommendation results generated by the recommender model.

According to a further aspect, there is provided a computer-implemented recommender system. The computer-implemented recommender system comprises: a hardware processor; a computer readable storage medium having program instructions embodied therewith, the program instructions executable by the hardware processor to cause the hardware processor to: access, by a user, via a remote computer system, an on-line recommender application used to generate recommendations on a given search topic or concept; select, based on a user profile information, a machine-learned recommender model for use by the recommender application to search and generate search results based on the given topic or concept, the selected recommender model having one or more trained model parameter values; run the recommender model responsive to the one or more trained model parameter values for conducting a search and generating a halo of recommendation results, the generated halo of recommendation results comprising a dataset that expands and diversifies the content range for the given topic or concept to a degree based upon an application data set and the one or more model parameter values; and display, via a user interface of the computer system, the generated halo of recommendation results generated by the recommender model.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION OF PREFERRED EMBODIMENTS

Figure 1A:
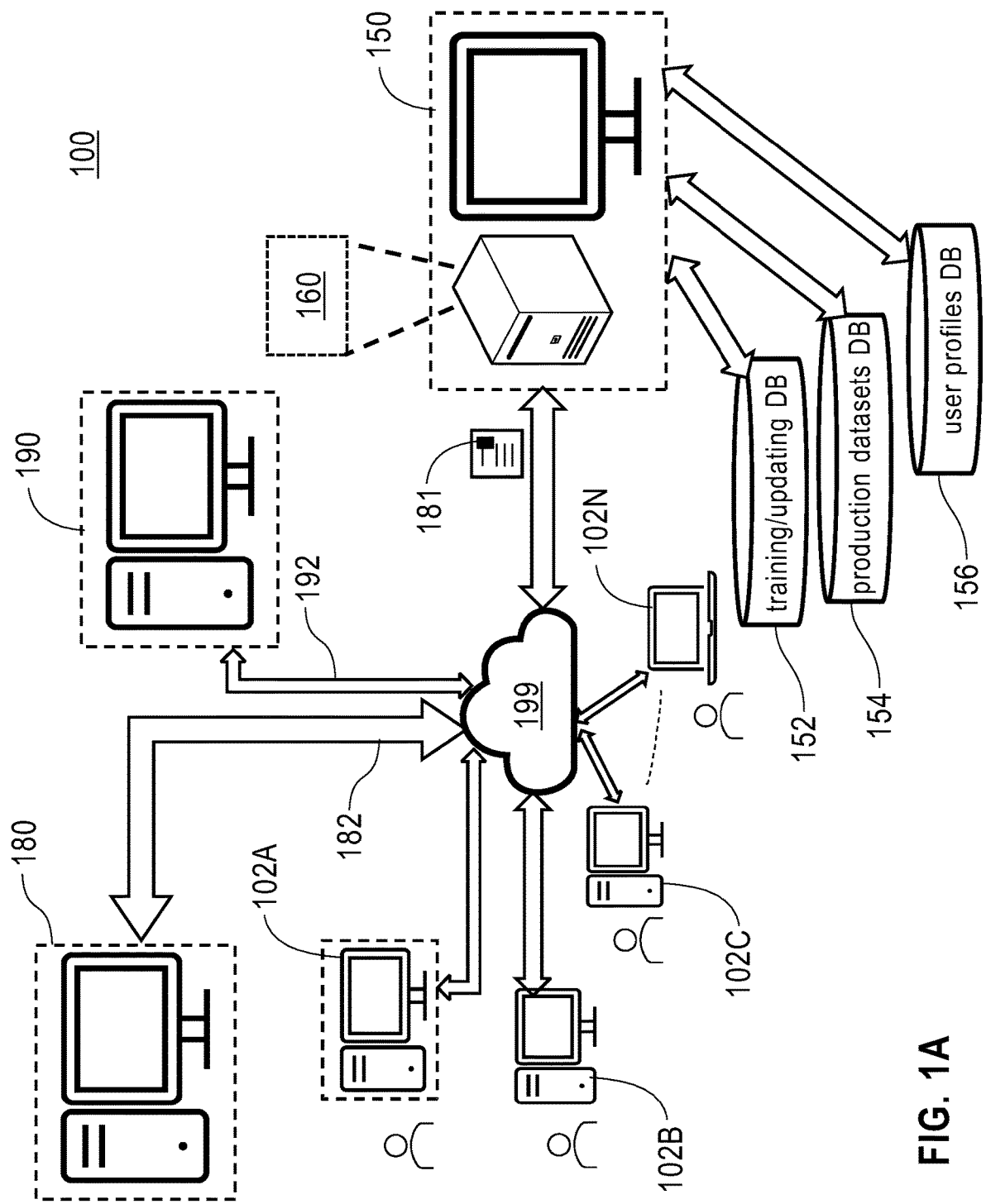
FIG. 1A depicts an overall recommender system architecture 100 according to an embodiment.

FIG. 1A depicts an overall recommender system architecture 100 which is a web-based system implementing methods for diversifying a user's perspective through a recommendation mechanism called a "curiosity halo" that uncovers a broad, even competing, range of ideas around a topic.

In the recommender system 100 of FIG. 1A, methods are provided to facilitate non-biasing search queries, social media feeds, and other platforms in which multiple users can search, scroll, and engage with information and ideas so that a user can explore ideas outside of, or even contrary to, the ones with which they are typically aligned. The curiosity halo recommender system includes a communications network 199 including multiple user devices 102A, 102B, . . . , 102N that can take many forms, for example, a computer, laptop, smart phone, personal assistant, terminal, a virtual computer, or virtual machine (VM), or a computing node.

Recommender system 100 includes a computing device such as a curiosity halo recommender system server 150 providing a curiosity halo recommender system including curiosity halo recommender system software program or application 160 configurable to provide and enhance recommender system services to enable users to be made aware of the existence of other notions or concepts centered around a given search topic or connected to a topic.

With more particularity, as shown in FIG. 1A, the curiosity halo recommender system server 150 is accessible by devices 102A, 102B, 102C, . . . , 102N over a communications network 199. Any device 102A, 102B, 102C, . . . , 102N can connect to the curiosity halo recommender system 100 either through a web-based portal or a distributed application at a user or participant's device (hereinafter referred to as "client device"). In embodiments, the client devices 102A, 102B, 102C, . . . , 102N include application software that provides an interface enabling the users to interact with the curiosity halo recommender system 100. In embodiments, the curiosity halo recommender system 100 will allow a user to conduct searches or engage in any activity that involves searching and provide search results and/or the unsolicited pushing of data or other information that may be determined by the curiosity halo recommender system as potentially piquing a curiosity interest of the user. In the manner as described herein, the search results or data/information provided may be out of context with the user's current on-line or searching activity—i.e., the user is presented with results that deviate from those that traditional recommendation engine models would generate.

In further view of FIG. 1A, network connected remote computer system 180 is accessible by the curiosity halo recommender system server 150 to surface curiosity halo recommender data or information 181 to the user. In an embodiment, computer system 180 passively provides the user with data or information, e.g., in the form of news streams or social media feeds 182. A further computer device 190 is accessible by the curiosity halo recommender system server 150 to provide data or information 192 to the user such as search results in response to a pro-actively entered user query, media recommendations, unsolicited recommending of products/services to users, or otherwise providing interactions with users to ascertain a user's retail experience and thus require proactive user interaction or responses based on recommendations surfaced by an application. As will be explained, any actions taken by a user with respect to a surfacing of recommender results (whether passive or requiring user responses) can be used by the recommender system 100 in evaluating users and ascertaining/updating a user's profile/interests and updating/revising the curiosity halo recommendation parameters.

In further view of FIG. 1A, curiosity halo recommender system server 150 interfaces with one or more databases, e.g., a database 152 providing the relevant production datasets for real-world recommender system use or the relevant datasets associated with any real-world application, e.g., a searching application, a shopping application, etc., that makes a recommendation as part of it (e.g., Amazon.com® a registered Trademark of Amazon.com Inc.); and a database 154 providing relevant datasets or smaller dataset segments for use in training, tuning, revising or updating the curiosity halo results generating and can comprise dataset segments that can be used to train the curiosity halo "plug-in" to get parameters that are needed. A further database 156 may include data about users that have been accumulated by a particular real-world application (i.e., searching application, shopping application) and includes user profile information including user characteristics such as, but not limited to: interests, past purchases/transactions, user demographic information, etc.

Figure 1B:
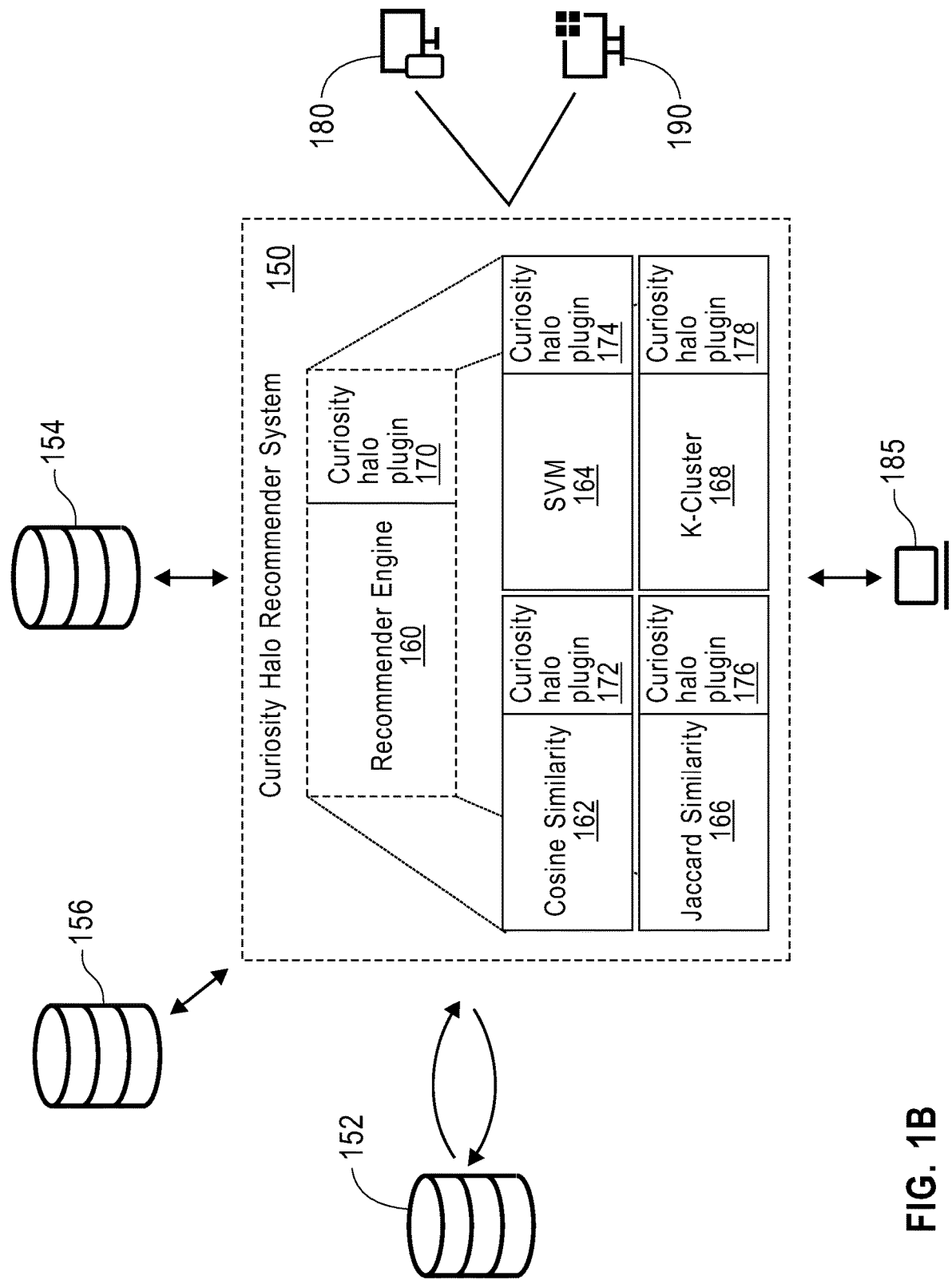
FIG. 1B conceptually depicts an embodiment of the curiosity halo recommender system server and a software system architecture 151 according to an embodiment.

FIG. 1B conceptually depicts an embodiment of the curiosity halo recommender system server 150 having a software system architecture 151 that includes a recommender engine application process running on the curiosity halo recommender system server 150 and a variety of plug-in application modules. One generic recommender system is a host curiosity halo recommender engine application 160 that is equipped with a curiosity halo plug-in application module 170 providing functions and relevant recommender system parameters used for building, training and/or using the curiosity halo recommender engine of the present disclosure. In FIG. 1B, the curiosity halo recommender system server 150 can implement a process including the running of a single recommender algorithm (e.g., one of a Cosine Similarity recommender algorithm, a support vector machine (SVM) recommender algorithm, a Jaccard Similarity recommender algorithm, or a k-Clustering recommender algorithm or other recommender systems where threshold computations are made), or implement running a process including a hybrid of two or more of these recommender engine algorithms. As shown in FIG. 1B, regardless of the recommender engine implementation, each recommender engine includes a corresponding curiosity halo plug-in application module, e.g., the Cosine Similarity engine application 162 having a corresponding curiosity halo plug-in application module 172 providing services and functions for procuring curiosity halo recommender results using cosine similarity algorithm(s); a support vector machine (SVM) recommender engine application 164 having a corresponding curiosity halo plug-in application module 174 providing services and functions for procuring curiosity halo recommender results using SVM algorithm(s), a Jaccard Similarity recommender engine application 166 having a corresponding curiosity halo plug-in application module 176 providing services and functions for procuring curiosity halo recommender results using Jaccard similarity algorithm(s), and a k-Clustering recommender engine application 168 having a corresponding curiosity halo plug-in application module 178 providing services and functions for procuring curiosity halo recommender results using k-Clustering algorithm(s). In embodiments of the present disclosure, as a result of training the curiosity halo plug-in for a particular recommender engine whether embodied as implementing a single recommender algorithm or a hybrid of multiple recommender algorithms, each of the respective curiosity halo plug-ins make use of the trained relevant system parameters needed such as: 1) a recommender system threshold value which is a threshold demarcating the boundary where the curiosity halo results will be started; and 2) a recommender system curiosity halo spectrum range which provides a limit as to how far away from the threshold the recommended curiosity results will go for surfacing to the user (hereinafter curiosity halo (CH) model parameters).

Each of the various recommender engine applications 160-168 provide a respective curiosity halo plug-in services interface (not shown) that enable communication and interfacing with a respective curiosity halo plug-in module 170-178 according to known data exchange protocols that can be used to build, train and use the curiosity halo recommender system engine.

In providing curiosity halo recommender services, each of the various recommender engines 160-168 and their respective plug-in modules 170-178 are shown in FIG. 1B as further interfacing with the computer server devices 180, 190, and interfacing with a further computing device 185 that is adapted to provide curiosity halo recommender system administration such as continually monitoring, revising and training the recommender system models.

In an embodiment, curiosity halo recommender engine plug-in runs a machine-learned (ML) model ("curiosity halo model") that has been built and trained to a user profile on one or more bases from analysis of one or more user search queries and/or social media feeds. Associated with the built model are recommendation thresholds as initial boundaries of the model and spectrum ranges demarcating how far away from the initial boundaries recommended curiosity results may be surfaced to the user. Using the ML curiosity halo model and recommendation and spectrum range thresholds, the ML curiosity halo model output results can be filtered to obtain results that fall outside the typical recommendation thresholds.

Figure 2:
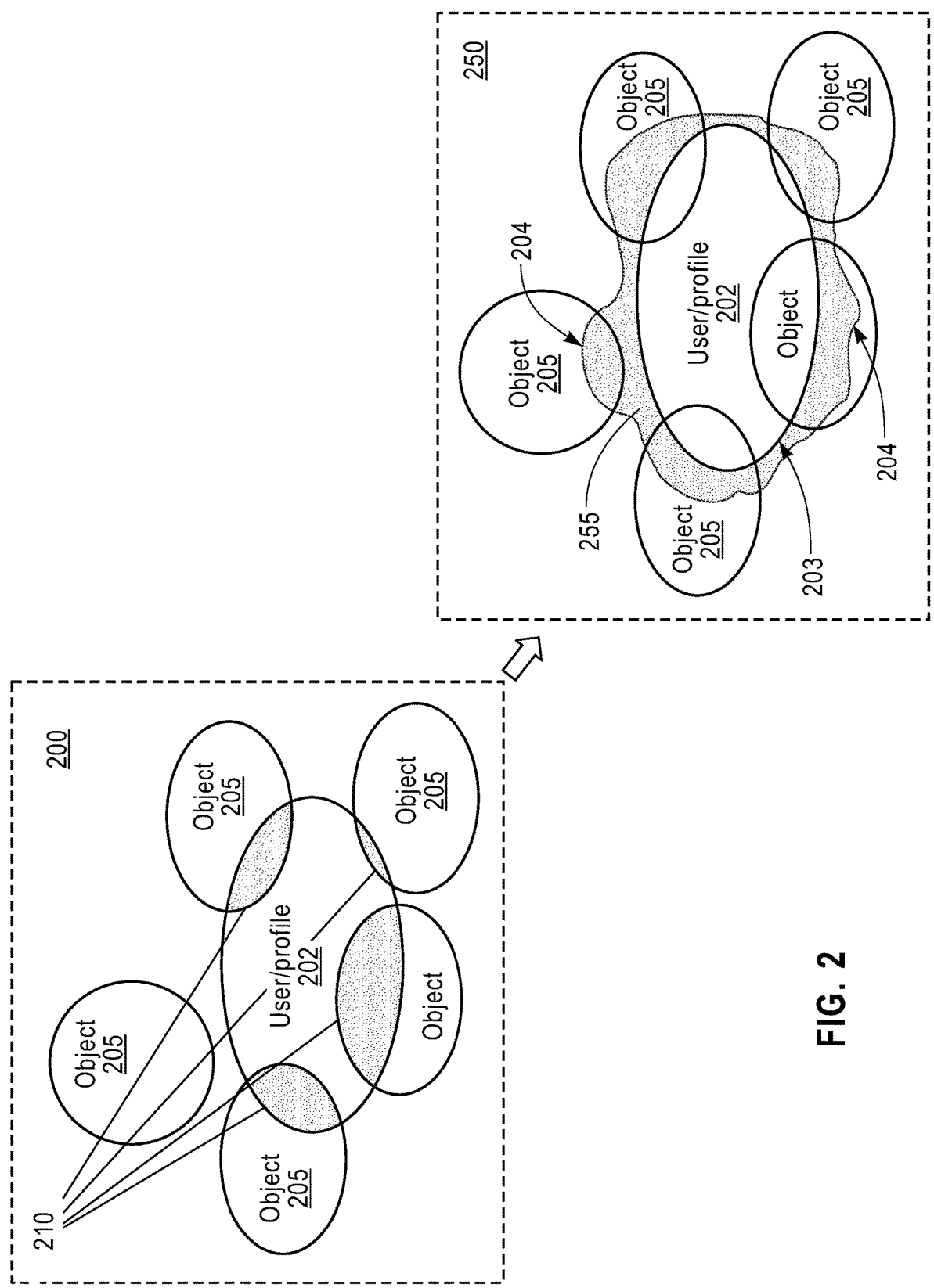
FIG. 2 conceptually illustrates the "filter bubble" results that a standard recommender engine provides to users versus the curiosity halo recommender engine that provides curiosity halo results according to aspects of the present disclosure.

As an illustrative example, FIG. 2 conceptually illustrates the "filter bubble" results that a standard recommender engine 200 provides to users versus the embodiment of a Curiosity Halo (CH) recommender engine 250 that provides curiosity halo results according to aspects of the present disclosure. In FIG. 2, using a standard recommender engine 200 that operates based on a current user's profile 202 consisting of any information known about the user, search results for a user can get locked into various areas, topics and ideas and the user do not see any alternative results because the system 200 continually recommends and builds on the analyses made based only on individual's interests (i.e., the recommender system's representation of the user profile or history of interactions). This is because, depending upon the system, the various recommender engines of recommender system can produce data sets for a given topic shown represented as objects 205, and the actual information or data results produced that are returned to the user as recommendations for the given topic consist of the intersections (a filter bubble) 210 between each result object dataset 205 and the user profile 202.

To the contrary, in an embodiment of the present disclosure, the CH recommender engine 250 of FIG. 2 builds upon the standard recommender engine 200 by expanding or taking variations of things just outside of the user profile (i.e., the recommender system's representation of the user interest profile) and generating intersections with the same object datasets 205 to produce an example "halo" of data set results 255 that allows the user to be exposed to a range of things outside of the user's existing filter bubble and that can be used to inspire or entice the user to places outside of what would be normally filtered or be typically recommended for the user according to the standard recommender. While the standard recommender engine 200 will produce results that are typically close in interest to the user's profile information fed into the recommendation engine (e.g., using an initial boundary threshold parameter), in an embodiment, the CH recommender engine 250 will provide curiosity halo results 255 by filtering out or subtracting those produced results aligned with the user profile information that the system knows the user has already been exposed to and to only show things the user has not yet seen. Thus, the CH recommender engine 250 offers users a means of "branching off" from those search results most aligned with their preferences and browsing history by training and selecting models to locate results with some overlap but enough productive differences so that they fall outside of those recommended by standard search engines. The recommender engine and curiosity halo model can also produce recommendations from a cold-start state when no user history or profile information is known or has been built up.

Figure 3:
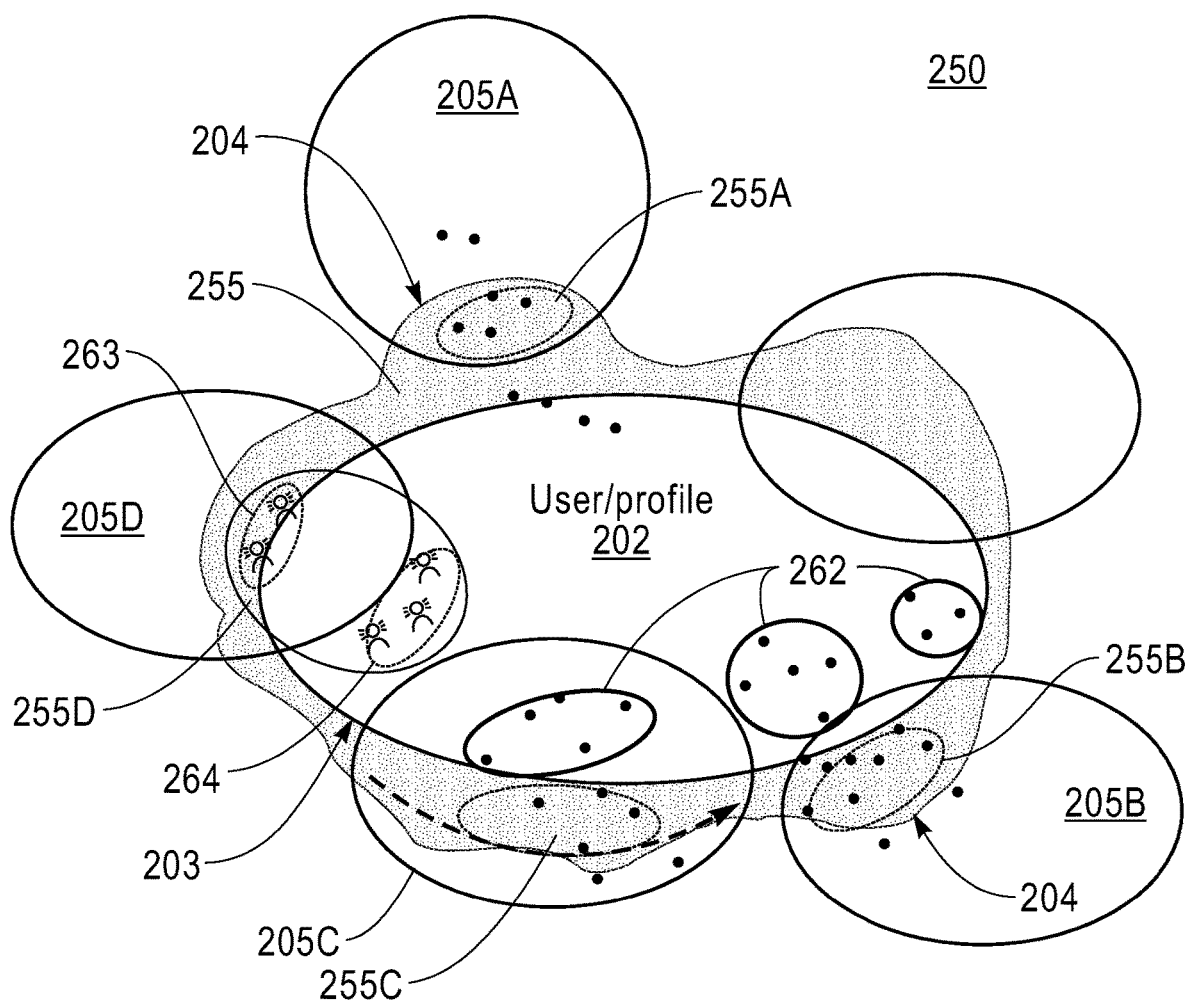
FIG. 3 depicts a further view of the curiosity halo recommender engine that provides curiosity halo results according to aspects of the present disclosure.

FIG. 3 depicts a further view of the CH recommender engine 250 that provides curiosity halo results 255 according to aspects of the present disclosure. In FIG. 3, each object dataset 205 is produced by implementation of a different algorithm, e.g., a results dataset object 205A obtained by running a cosine similarity distance measure algorithm; a results dataset object 205B obtained by running a K-Clustering algorithm for grouping unlabeled datasets; a results dataset object 205C obtained by running a support vector machine (SVM) learning algorithm for classification and regression analysis; and a results dataset object 205D obtained by running a Jaccard similarity algorithm used for gauging similarity and diversity of data sets. Further depicted in FIG. 3 is the example curiosity halo 255 with possible methods for determining an initial threshold which is effectively the boundary of the user profile (i.e., all data sets overlapping with inside the user's profile is typically recommended). However, in order to determine additional non-typical recommendation items and show things to a user that they would not be normally exposed to, the user's profile edge or boundary must be determined. By setting forth this threshold or boundary edge 203, on one side of the edge would be located things that have been recommended and shown (surfaced) to the user while the other side of the edge is located things that have not been shown to the user. Once the edge (initial threshold) is determined the recommender engine search can be conducted into more unknown territory than would be conducted if solely based on just the user profile. The limits of this search into more unknown territory is specified in the recommender engine by a parameter referred to as a "spectrum range" that defines an outer limit of the curiosity halo boundary 204 beyond which no further curiosity results search is conducted. A spectrum range value is computed through the use of one or more data points; it can be as simple as a static value and all results between the threshold and this static value (added to the threshold) constituting the curiosity halo result set. The spectrum range value can instead be determined by a percentage, either by selecting a value that is some percentage of the threshold value itself or by doing some averaging of the set of data that resides wholly outside of the threshold and then selecting a parameter to serve as the minimum set of data points needed to make a curiosity halo. From this, one can then compute the spectrum range value. In all cases, these examples can be used as starting points, and further monitoring can allow an administrator to adjust and revise the computation of the spectrum range value.

In view of FIG. 3, in an embodiment, the curiosity halo recommender engine is a process employing one or more of the different methods for computing the data set result objects 205A, . . . , 205D depending upon the end-goals of the user, the datasets employed, and the type of computations obtained. In embodiments, the recommender engine employs a single algorithm or a hybrid or combination of two or more different recommender similarity algorithms, e.g., Jaccard, cosine-similarity, k-clustering and SVM methods. For example, the representative cosine similarity curiosity halo results recommendation set 255A is generated as a result of a more deep-dive data searching beyond the user profile edge or boundary (a similarity threshold) for a determined range limited by the spectrum range parameter 204, as compared to dataset points within the user profile curve that would be typically recommended for that user. Likewise, the example K-cluster curiosity halo results recommendation set 255B shown in FIG. 3 is generated as a result of a more deep-dive data searching beyond the user profile edge or boundary as compared to dataset points 262 overlapping with user features found within the user profile curve 202 that would be typically recommended for that user. An example SVM curiosity halo results recommendation set 255C shown in FIG. 3 is generated as a result of a more deep-dive data searching beyond the user profile edge or boundary (threshold) as compared to dataset points set 262 overlapping with user features found within the user profile curve 202 that would be typically recommended for that user. In the case of the exemplary Jaccard curiosity halo results recommendation set 255D, this would be generated for a topic, for example, as a result based on detected similarity of that user's profile 202 with other user profiles. For example, results set 255D are produced from a more deep-dive data searching based on other users' interest profiles 263 that are somewhat dissimilar than the subject user profile 202 as compared to dataset points than would typically be recommended to the user as a result of searching based on overlap with other users having user interest profiles 264 more in common with the user as found within that user's profile curve 202.

Further in view of FIG. 3, the curiosity halo recommender using recommendation techniques of the present disclosure to compute a dynamic interest using the boundary threshold and spectrum range parameters, will determine a halo of interest 255 outside the recommendation bubbles to create a dynamic halo of information that has some relation to the user's current recommended information. The halo 255 will over time change based on the evolving user interest and engagement in new or nearby related information. Because the computation is always performed in relation to recommendations based on the current user interests, it will create a set of information that will nudge a user into engaging their curiosity because of the relation to their interest set.

In an embodiment of the curiosity halo recommender system, one or more methods are implemented to construct the halo, e.g., Jaccard, cosine-similarity, k-clustering and SVM methods. Each method incorporates trained parameters and performs computations used to determine what results are relevant or not, i.e., should or should not be included in resulting recommendations for a given user/application. In an example hybrid-type implementation, each of the method(s) can be run simultaneously using the same data inputs. In another example, dataset output results obtained from running one algorithm (e.g., Jaccard) can be input to another algorithm (e.g., cosine-similarity) that is run to obtain a results combination that could be recommended to a user. Alternatively, a second run algorithm can provide output that functions to filter and/or run a calculation of the results of a first run algorithm. Whether running the recommender methods singly, simultaneously, or in combination, all results obtained from these different algorithms are continually monitored for accuracy as some combinations of algorithms may work better than others as data changes, user profile changes, etc.

There is now described the various recommendation similarity computation techniques employing boundary thresholds that can be employed in the computation of curiosity halos according to embodiments herein. In an embodiment, the Cosine Similarity algorithm involves the computing of vectors between entities and user associated items, and the computing of the cosine of these vectors. Values that are "1" or close to 1 indicate similarity between the vectors. In this computation, any value over about 0.5 reflects likely similarity and these entities are surfaced via recommendation user interface (UX). For a curiosity halo implementation, the computation to compute the curiosity halo would make use of the value that is used as the threshold of similarity, e.g., 0.5. However, the method creates two computations, first a curiosity halo spectrum, which can be fixed or computed dynamically, through common various means used to optimize the similarity threshold value. The curiosity halo would then be a value that is a slice or percentage of the threshold. For example, given that this spectrum is set at a value at 10%, the method computes the curiosity halo to be similarity threshold value-curiosity halo spectrum, e.g., 0.4. In one or more embodiments, the threshold used is determined by the recommender algorithm and the threshold determined by said recommender is utilized as one edge of the curiosity halo. Optimizing the threshold can result in optimizing the spectrum, which can be done in real time as the system gathers various similarity measurements. The spectrum value can be broadened or narrowed, and this can be done through a static measure (or a static measure to start), then observe user behavior or weigh a preponderance (or lack thereof) of data points to change this halo spectrum value and recompute the curiosity halo dynamically.

In an embodiment, the K-Clustering algorithm takes a large data set and creates affinities/groupings, clustered around "central" data points. The algorithm does sets of passes to continually recompute the "center" point of a set of data items and then uses distance computations to re-assign a cluster. This is effectively continued for passes until no data points get reassigned to a center point. To make a recommendation for a user, the method looks at all the clusters s/he belongs to, and the users in those clusters, then the items consumed by any user contained in those clusters. This will provide a list of new items that share a cluster with a user of interest has consumed. For each item, in fact, the system can count how many distinct users have consumed it. This will give you a "strength" of the recommendation. In an embodiment, for the curiosity halo recommending, all the clusters where the user or their interest is grouped can be ignored, but instead take those clusters nearest to clusters the user/or their interest. To compute the curiosity halo, the system finds the clusters that do not have this user/profile grouped within, but which are closest to those clusters where the user/profile is grouped. The halo boundary can be computed as a percentage of closest, or as a percentage of all clusters, and dynamically determined to allow for varying the curiosity halo in real time.

In an embodiment, for recommendations, the Jaccard Similarity algorithm performs a computation to effectively take two datasets and computes the ratio of intersection divided by the overall sizes of the sets. The closer the computed value is to "1," the more similar these two sets are. In an embodiment, values that are about 0.5 or above are considered similar, similar enough to be recommended. Again, similar to other methods, computing a curiosity halo includes selecting values that fall just below the threshold of "similarity", and use dynamic treatments to vary the halo's size, to compute the outcome of entities that can be exposed to the user in terms of recommendations outside of their direct sphere of profiled interest.

In an embodiment, the SVM algorithm classifies users into similar groups or for a user, classifies other users into either similar or dissimilar groupings. An SVM computation will create a threshold as a line or a plane, separating the groups. There is a margin around the threshold as well, and this margin can help determine the curiosity halo. In effect the curiosity halo is another margin, and it is computed as starting at the center where the exact threshold lines up and then extending it into the area that is dissimilar. The threshold would vary it dynamically in order to construct a set that will comprise the curiosity halo, and it can be set to be some percentage of the margin or comprised of some percentage of the overall data set that is on the dissimilar area.

The curiosity halo recommender system thus breaks users out of the filter bubble, in particular by creating a way to provide a data set that allows user to be exposed to something outside their existing filter bubble. Recommendation threshold values can be adjusted at each data set algorithm to tailor/specify a degree of results outside of that user's filter bubble, e.g., a parameter that varies results that explore additional information in a small step vs. a large gigantic leap into an unknown world of information, e.g., in accordance with the computed spectrum range value. It is understood that the recommender engine is responsive to direct action such as a user entering a search query in the recommender engine, or as a result of indirect action, e.g., recommendations pushed to the user by virtue of things that user has purchased or indicated liking in the past.

Figure 4B:
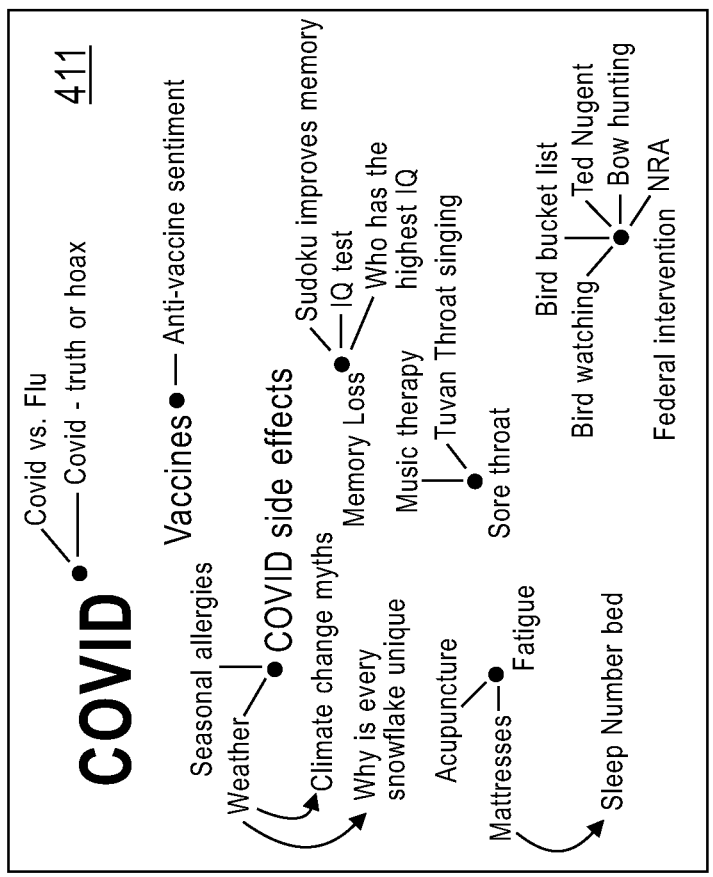
FIG. 4B depicts the same example search results having varying/opposite opinions and areas of interest to explore/learn as using the curiosity halo recommender engine according to an example implementation.
Figure 4A:
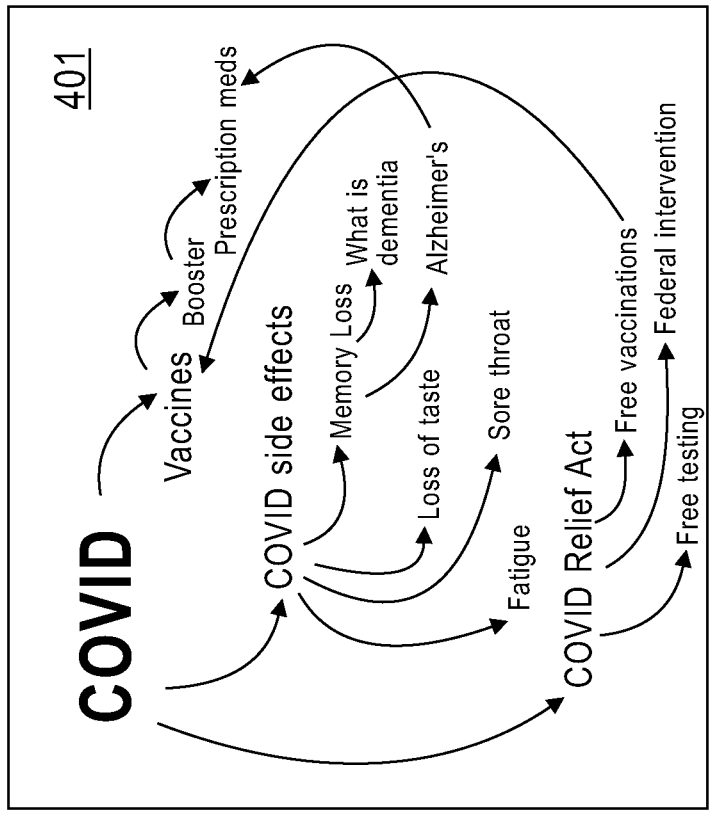
FIG. 4A depicts an example of standard recommender search results and related topics.

FIG. 4A depicts an example of search results 401 in closed loop (e.g., locked in a bubble) vs. an example of search results 411 by replicating conversation bursts with varying/opposite opinions and areas of interest to explore/learn as shown in FIG. 4B. In particular, using a standard recommender engine, given a news stream search topic such as "COVID", recommended results or topics that can be surfaced to the user as shown in FIG. 4A, can include popular concepts that are related, e.g., Federal interventions, side effects, fatigue, vaccines, memory loss, etc., and each of these concepts are related or tangentially related. The font sizes of the surfaced topic result terms shown are sized to represent popularity within a dataset (e.g., font size of COVID Relief Act is much bigger than "Federal Interventions"). However, using the curiosity halo recommender engine implementing either a single algorithm or a combination of dataset recommender algorithms, given a news stream search topic such as "COVID", recommended results or topics that can be surfaced to the user can include other tangentially related concepts in FIG. 4B that would not appear so related, e.g., music therapy, acupuncture, seasonal allergies, truth vs hoax, bird bucket list, anti-vaccine sentiment, etc., and each of these concepts are either tangentially related or dramatically different (outside the user's filter bubble results that are in FIG. 4A).

Figure 5:
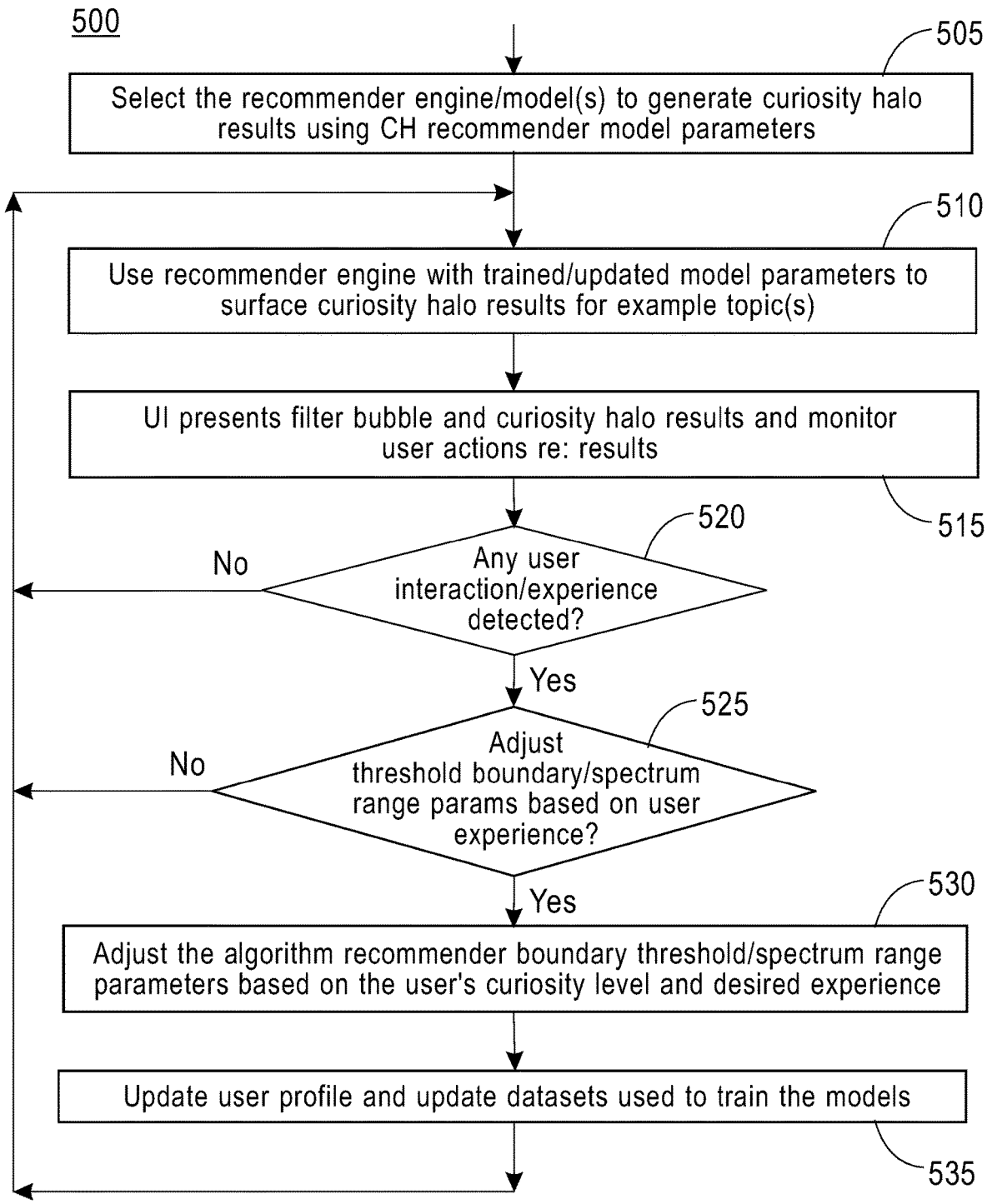
FIG. 5 depicts a method of using an adaptive curiosity halo recommender according to aspects of the invention.
Figure 6:
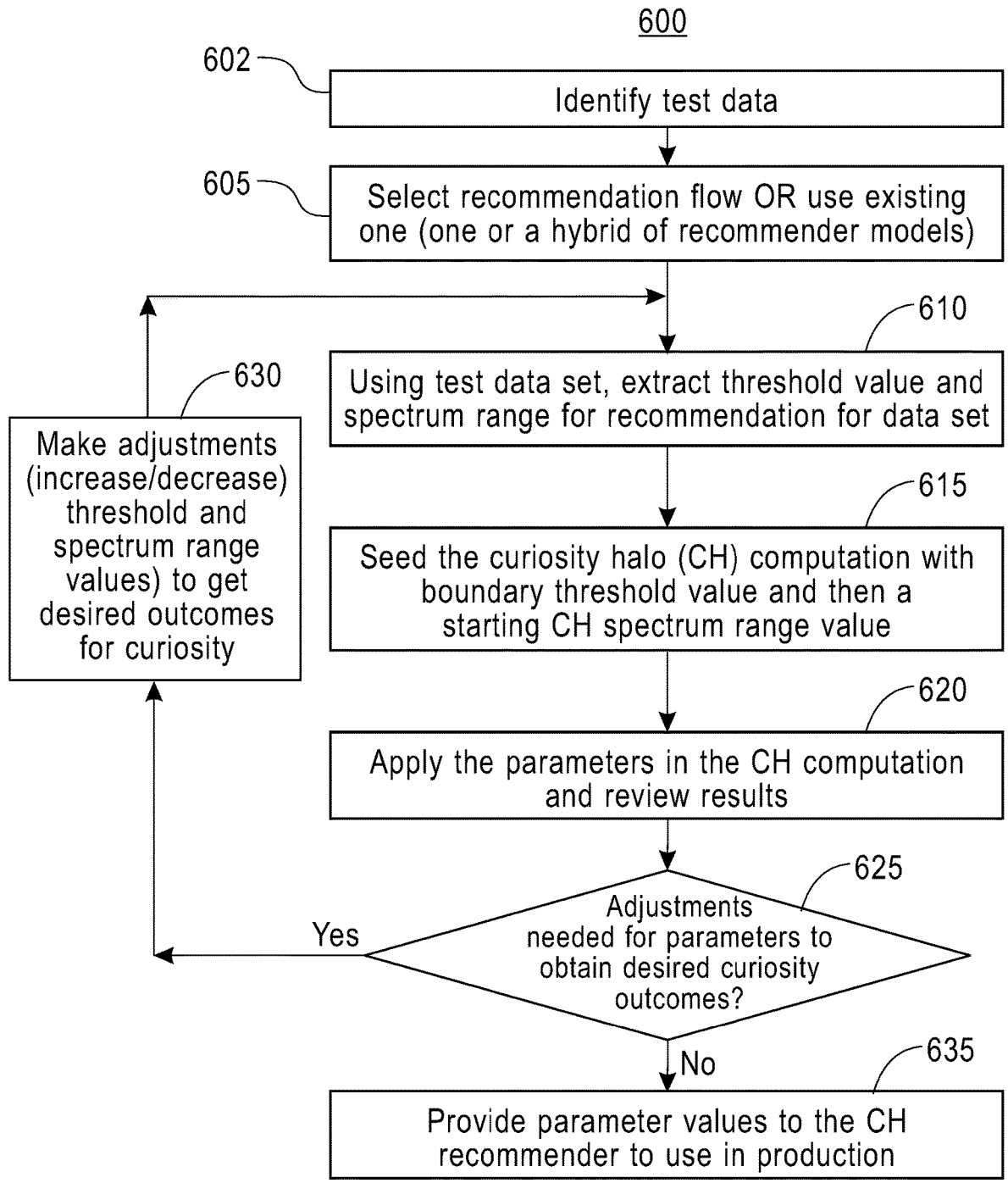
FIG. 6 is a flow chart depicting a model training method used to train a curiosity halo recommendation engine in an embodiment.

FIG. 5 depicts a method 500 of making and using an adaptive curiosity halo recommender engine according to aspects of the invention. Initially, a recommender engine has been built for a particular application making recommendations and a particular user curiosity level, the engine using one or more selected recommendation similarity model algorithm(s) that has(have) been trained in accordance with the method depicted in FIG. 6. FIG. 6 particularly describes the model training method which generates a recommender boundary threshold and spectrum range parameters from the algorithm(s) which could be accomplished using thresholds from recommender similarity algorithms from cosine similarity, K-means clustering, Jaccard similarity, and SVM as a basis. In embodiments, the model(s) is(are) trained with various datasets the user or builder is primarily interested in, e.g., products or services to be provided for users. Each dataset will have a recommendation threshold associated with it for use in the training, e.g., a smaller threshold that is used to obtain standard recommender results vs. a larger threshold that is used to generate results configured to pique the user's curiosity about different topics or concepts. In an embodiment, as part of the curiosity halo, the parameters can be varied dependent on intent to provide nearby items (near to the user's current recommended items) or much more distant items, still with some thread of connectivity but based on the recommendation computation which goes beyond complementary topic determination.

In the method 500 of FIG. 5, a first step 505 is to select the recommendation engine (and the extracted trained recommender engine parameters) that will be used to generate CH results. Continuing to step 510, there is depicted the step of running the recommendation flow using the trained model and applying the obtained boundary threshold and spectrum range parameter values in the recommender engine to computer and surface curiosity halo results for the particular application or topic(s).

As the curiosity halo recommender is adaptive, results are surfaced with related content presented in a manner that the user can control how curious they want to be and continuously encourages exploration resulting in the curiosity halo (CH) dynamically shifting based on user interaction. For example, in the search and recommendation processing using the CH recommender system 100, the existence of potential filter bubbles can be exposed thus enabling users to adjust their curiosity threshold and tolerance for deviation based on their desired experience. In an embodiment, user feedback is obtained based on the user interactions with the types of recommended results, which feedback can be used to modify recommender threshold and spectrum range parameters of the recommender model algorithms. Continuing to step 515, responsive to the running the recommendation engine and the surfacing of filter bubble and/or curiosity halo results for the user experience in accordance with the CH model parameters, the recommender system can monitor and receive real-time feedback that can be used to enable adjustment of the curiosity halo engine results produced by the system. In an embodiment, the user, via an interface, can be provided with standard recommender results and/or curiosity halo results and the user behavior or experience is monitored with respect to each. For example, the user can provide real time feedback (e.g., click throughs) that can be monitored by the system to ascertain the user's curiosity level and tolerance for divergent thinking. In one embodiment, the real-time user feedback can be obtained implicitly, by merely monitoring user selections or clicking of links of any of the curiosity halo results and/or standard recommender results, or for example, by monitoring a user's eyes via an eye-tracking system to see if user skips over or does not read any results type. Otherwise, the real-time user feedback can be obtained explicitly, e.g., by providing queries asking whether the user would like to see/review some of the curiosity halo dataset results via a display user interface that a user can answer via the interface and by observing how the user behaves, or by pro-actively prompting and/or monitoring a user to provide active feedback such as by requesting the user to actively select and/or comment on a specific deep dive curiosity halo dataset result(s) rather than a standard (filter bubble) recommender results. Based on these active feedback results, a determination is made at 520 whether the system has received user feedback to ascertain the user's experience with respect to the curiosity halo results surfaced. If no user feedback has been received, the process returns to 510 for continued use of the recommender engine with the trained model parameters for the subject application and the steps repeat. Otherwise, if it is determined that user feedback is received indicating a detected interaction and user experience, the process proceeds to 525 to determine whether the recommender boundary threshold and spectrum range parameter(s) of the recommender algorithm(s) should be changed to increase alignment of the curiosity halo recommender engine algorithms with user experiences.

If at 525, FIG. 5, it is determined that there is no adjustment of the model's recommender threshold needed, the process will return to step 510 in order to continue use of the trained recommender model to surface different types of standard or curiosity halo results datasets for the subject application. Otherwise, at 525, if it is determined that the recommender thresholds of the recommendation model algorithms should be adjusted, the process proceeds to 530 where the boundary threshold and/or spectrum range parameters of the recommender engine is modified based on the user's curiosity level and desired user experience. At 530, FIG. 5, upon adjusting the boundary threshold and spectrum range parameters of the recommender engine model, e.g., to modify the recommender engine's ability to generate types of curiosity halo results in response to monitored user feedback, the process can return to 510 level in order to continue use of the trained recommender model to surface different type of standard or curiosity halo results datasets. In view of FIG. 5, the boundaries of the curiosity halo can be continually redrawn in real time based on search and retrieval processes and user interactions. Further, at 535, FIG. 5, in response to the adjusting the boundary threshold and spectrum range parameters of the recommender engine model based on user experience feedback, the user profile information is updated, e.g., based on new information regarding a user's interest or determined curiosity level, in addition to updating the datasets that are used to train the models for the subject application, e.g., to prevent surfacing of curiosity results in a curiosity halo that may be now acceptable to the user as a standard in view of the user feedback actions. For example, a user may be initially rated based on a user risk assessment—a user risk profile—so that if the user is determined risk adverse, and not taking big leaps, then the algorithms will not search for alternative dataset items that are not too far beyond the recommendation threshold; but if a user risk rating has changed, e.g., and determined as willing to take risks, the user profile will be so updated and search algorithms will then be provisioned with the parameters having values that can conduct a search to locate topics and ideas farther beyond recommendation threshold such as to expose the user to a greater wealth of information.

FIG. 6 is a flow chart depicting a model training method 600 used to train a curiosity halo recommendation engine. In embodiments, the building and training of a CH recommender engine involves an initial determining of a model algorithm for use in the engine. Here, a builder can experiment with one or more various recommendation system algorithms (e.g., Cosine similarity, Jaccard Similarity, k-Clustering or SVM similarity) and select the most appropriate one or a combination based on the particular application used to leverage the curiosity halo, the types of datasets to be explored and type of experience the user expects as results (e.g., small step searches due to user's risk adverseness vs. large leap searches into unknown territory).

In an embodiment, several curiosity halo recommender models can be trained and the best trained model(s) can be selected to generate a threshold that is just outside of a user's search patterns. In this embodiment, the recommendations provided will not necessarily be in direct opposition to trending searches of the user but can be tangential to, derivative from, or orthogonal to their searches so as to surface not just polar opposite ideas but avenues for curiosity and creativity.

Then, upon selecting the most appropriate algorithm(s), the selected model(s) is(are) trained to generate a curiosity halo from which the model training method generates a recommendation threshold parameter as an initial boundary threshold and an initial spectrum range parameter as a boundary limiting the extent of the recommender searching for use by the recommendation engine in a recommending flow.

Referring to FIG. 6, at a first step 602, the method includes identifying test datasets for the subject application for which the curiosity halo results are to be generated for users using one or more of the recommender similarity algorithm(s), i.e., cosine similarity, K-means clustering, Jaccard similarity, and SVM, as a basis. At 605, FIG. 6, a model builder selects a recommender model to be trained, the model implementing one recommender similarity algorithm or a hybrid of two or more recommender similarity algorithms to be trained. The objective of the training method is to obtain boundary threshold and spectrum range parameters for use in the final recommendation model. At 610, the training method inputs a test dataset and extracts the initial threshold value for recommendation for data sets. Then, at 615, the method seeds the curiosity halo (CH) computation with the initial threshold value and then a starting curiosity halo (CH) spectrum range value. At 620, FIG. 6, the training method performs CH computation(s) of the recommender algorithm(s) and the generated results are reviewed. Then, at 625, a decision is made as to whether any model parameter adjustments are needed in order to obtain desired curiosity outcomes that may align with a users' curiosity level and desired experience. If, at 625, it is determined that adjustments are needed, then the process proceeds to 630 where the method adjusts, i.e., increase or decrease, each of the boundary threshold and spectrum range parameter values to get desired outcomes for curiosity. Then, the process will return to 610 and the training method steps 610, 615, 620, 625 are iteratively repeated until at step 625 it is determined that no further adjustments are needed to the seeded boundary threshold and spectrum range parameter values. At such time no further adjustments are deemed needed, then at 635, the final boundary threshold and spectrum range parameter values are provided to the trained CH recommender engine to use in curiosity halo production.

The recommender engine running the ML curiosity halo recommender model(s) thus enables users to engage to be directed to adjacent notions and "lines of flight" around a topic, thereby broadening the user's perspective and strengthening the user's ability to think "outside the box"—or filter bubble. By adjusting a user's threshold based on curiosity level and tolerance for divergent thinking, the boundaries of the curiosity halo are continually redrawn in real time so that users can dynamically uncover topics and ideas outside of their day-to-day experience.

In one aspect of the present disclosure, the recommender system platform 100 of FIG. 1 is agnostic, and recommender models are training models using thresholds from cosine similarity, K-means clustering, Jaccard similarity, and/or SVM to expand search results in unexpected directions. The curiosity halo recommender can also be applied outside of a searching application and can be used in any recommendation system.

In addition, the system and methods of the present disclosure is based on giving the user agency to experiment with different affinity levels in the search results they encounter. For example, a goal is not necessarily to surface high-quality or even unaccessed content—though those might be potential positive byproducts—but instead to present the user with results that deviate from those that traditional recommendation engine models would generate by extending them within a "curiosity cloud" of quasi-affinities that is dynamically redrawn in real time to account for the user's newly trending search topics and behaviors.

While any Internet user would benefit from the curiosity halo recommender engine tool, creators, innovators, and businesspeople will find particular value in it. Anyone who has endeavored to seek out an innovative way of thinking or a unique way of solving a problem has experienced a flash of insight by virtue of merely being exposed to some thought or notion that lies just outside of their day-to-day experience. For example, writers and those in other creative disciplines could also find application by using this tool to uncover new and interesting storytelling and design ideas. Educators might also recommend the use of this tool to students who are actively building their information literacy skills.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 7:
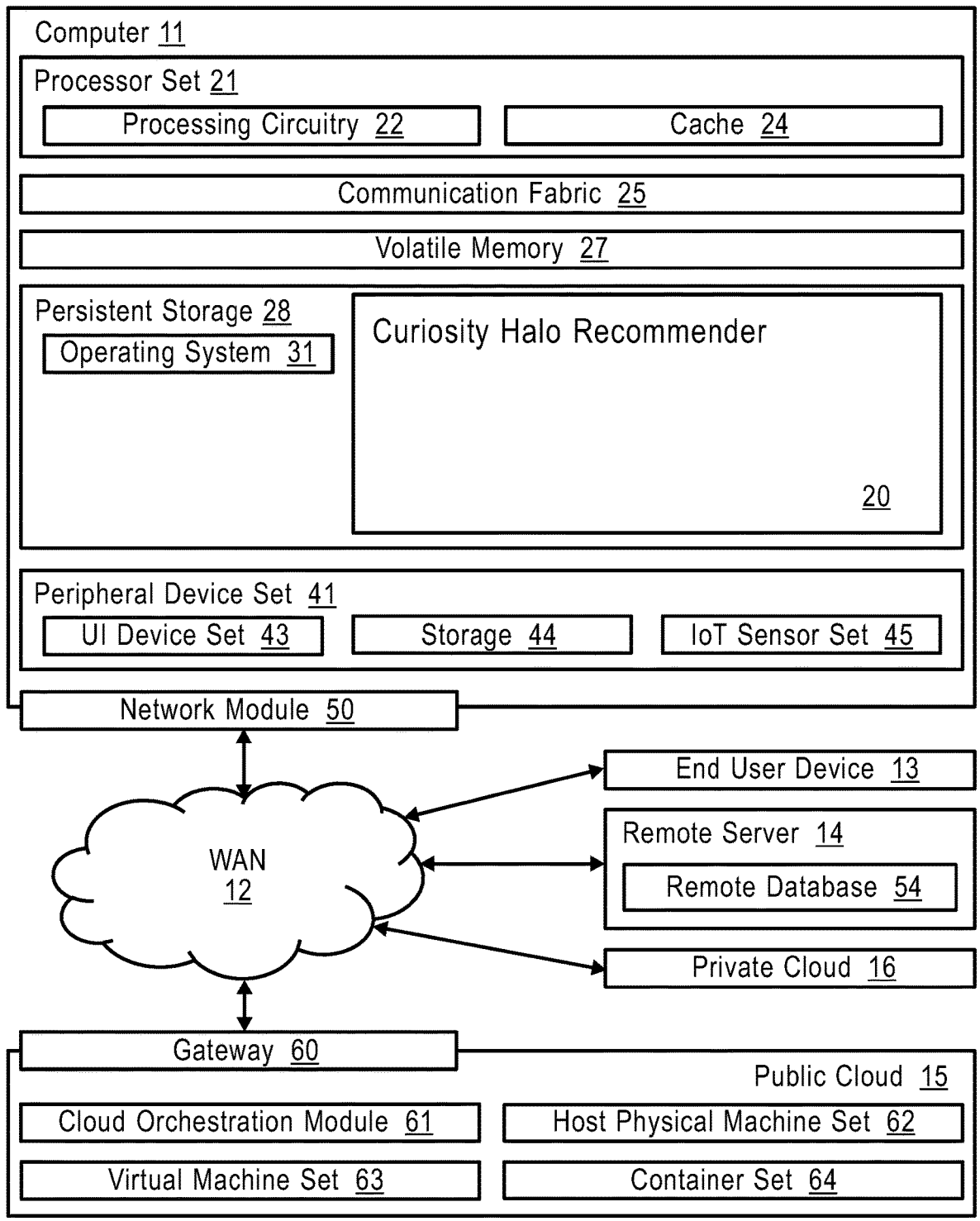
FIG. 7 depicts a computing environment providing an example environment for the execution of at least some of the computer code involved in performing the methods of the embodiments described herein.

As shown in FIG. 7, computing environment 10 contains an example of an environment for the execution of at least some of the computer code involved in performing the inventive methods, such as the curiosity halo recommender engine and method 20 that expands search queries to generate a curiosity halo using a recommendation threshold as an initial boundary and accomplished using thresholds from cosine similarity, K-means clustering, Jaccard similarity, and/or SVM as a basis, and surfaces the results from the curiosity halo to a user and that further provides opportunity for users to adjust their threshold based on their curiosity level and desired experience. In addition to block 20, computing environment 10 includes, for example, computer 11, wide area network (WAN) 12, end user device (EUD) 13, remote server 14, public cloud 15, and private cloud 16. In this embodiment, computer 11 includes processor set 21 (including processing circuitry 22 and cache 24), communication fabric 25, volatile memory 27, persistent storage 28 (including operating system 31 and block 20, as identified above), peripheral device set 42 (including user interface (UI) device set 43, storage 44, and Internet of Things (IoT) sensor set 45), and network module 50. Remote server 14 includes remote database 54. Public cloud 16 includes gateway 60, cloud orchestration module 61, host physical machine set 62, virtual machine set 63, and container set 64.

Computer 11 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 54. As is well understood in the art of computer technology, and depending upon the technology, performance of a computer-implemented method may be distributed among multiple computers and/or between multiple locations. On the other hand, in this presentation of computing environment 10, detailed discussion is focused on a single computer, specifically computer 11, to keep the presentation as simple as possible. Computer 11 may be located in a cloud, even though it is not shown in a cloud in FIG. 7. On the other hand, computer 11 is not required to be in a cloud except to any extent as may be affirmatively indicated.

Processor Set 21 includes one, or more, computer processors of any type now known or to be developed in the future. Processing circuitry 22 may be distributed over multiple packages, for example, multiple, coordinated integrated circuit chips. Processing circuitry 22 may implement multiple processor threads and/or multiple processor cores. Cache 24 is memory that is located in the processor chip package(s) and is typically used for data or code that should be available for rapid access by the threads or cores running on processor set 21. Cache memories are typically organized into multiple levels depending upon relative proximity to the processing circuitry. Alternatively, some, or all, of the cache for the processor set may be located "off chip." In some computing environments, processor set 21 may be designed for working with qubits and performing quantum computing.

Computer readable program instructions are typically loaded onto computer 11 to cause a series of operational steps to be performed by processor set 21 of computer 11 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 24 and the other storage media discussed below. The program instructions, and associated data, are accessed by processor set 21 to control and direct performance of the inventive methods. In computing environment 10, at least some of the instructions for performing the inventive methods may be stored in block 20 in persistent storage 28.

Communication Fabric 25 is the signal conduction path that allows the various components of computer 11 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

Volatile memory 27 is any type of volatile memory now known or to be developed in the future. Examples include dynamic type random access memory (RAM) or static type RAM. Typically, volatile memory 27 is characterized by random access, but this is not required unless affirmatively indicated. In computer 11, the volatile memory 27 is located in a single package and is internal to computer 11, but, alternatively or additionally, the volatile memory may be distributed over multiple packages and/or located externally with respect to computer 11.

Persistent Storage 28 is any form of non-volatile storage for computers that is now known or to be developed in the future. The non-volatility of this storage means that the stored data is maintained regardless of whether power is being supplied to computer 11 and/or directly to persistent storage 28. Persistent storage 28 may be a read only memory (ROM), but typically at least a portion of the persistent storage allows writing of data, deletion of data and re-writing of data. Some familiar forms of persistent storage include magnetic disks and solid state storage devices. Operating system 31 may take several forms, such as various known proprietary operating systems or open source Portable Operating System Interface-type operating systems that employ a kernel. The code included in block 20 typically includes at least some of the computer code involved in performing the inventive methods.

Peripheral Device Set 41 includes the set of peripheral devices of computer 11. Data communication connections between the peripheral devices and the other components of computer 11 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 43 may include components such as a display screen, speaker, microphone, wearable devices (such as goggles and smart watches), keyboard, mouse, printer, touchpad, game controllers, and haptic devices. Storage 44 is external storage, such as an external hard drive, or insertable storage, such as an SD card. Storage 44 may be persistent and/or volatile. In some embodiments, storage 44 may take the form of a quantum computing storage device for storing data in the form of qubits. In embodiments where computer 11 is required to have a large amount of storage (for example, where computer 11 locally stores and manages a large database) then this storage may be provided by peripheral storage devices designed for storing very large amounts of data, such as a storage area network (SAN) that is shared by multiple, geographically distributed computers. IoT sensor set 45 is made up of sensors that can be used in Internet of Things applications. For example, one sensor may be a thermometer and another sensor may be a motion detector.

Network Module 50 is the collection of computer software, hardware, and firmware that allows computer 11 to communicate with other computers through WAN 12. Network module 50 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 50 are performed on the same physical hardware device. In other embodiments (for example, embodiments that utilize software-defined networking (SDN)), the control functions and the forwarding functions of network module 50 are performed on physically separate devices, such that the control functions manage several different network hardware devices. Computer readable program instructions for performing the inventive methods can typically be downloaded to computer 11 from an external computer or external storage device through a network adapter card or network interface included in network module 50.

WAN 12 is any wide area network (for example, the internet) capable of communicating computer data over non-local distances by any technology for communicating computer data, now known or to be developed in the future. In some embodiments, the WAN 12 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End User Device (EUD) 13 is any computer system that is used and controlled by an end user (for example, a customer of an enterprise that operates computer 11), and may take any of the forms discussed above in connection with computer 11. EUD 13 typically receives helpful and useful data from the operations of computer 11. For example, in a hypothetical case where computer 11 is designed to provide a recommendation to an end user, this recommendation would typically be communicated from network module 50 of computer 11 through WAN 12 to EUD 13. In this way, EUD 13 can display, or otherwise present, the recommendation to an end user. In some embodiments, EUD 13 may be a client device, such as thin client, heavy client, mainframe computer, desktop computer and so on.

Remote Server 14 is any computer system that serves at least some data and/or functionality to computer 11. Remote server 14 may be controlled and used by the same entity that operates computer 11. Remote server 14 represents the machine(s) that collect and store helpful and useful data for use by other computers, such as computer 11. For example, in a hypothetical case where computer 11 is designed and programmed to provide a recommendation based on historical data, then this historical data may be provided to computer 11 from remote database 54 of remote server 14.

Public Cloud 15 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 15 is performed by the computer hardware and/or software of cloud orchestration module 61. The computing resources provided by public cloud 15 are typically implemented by virtual computing environments that run on various computers making up the computers of host physical machine set 62, which is the universe of physical computers in and/or available to public cloud 15. The virtual computing environments (VCEs) typically take the form of virtual machines from virtual machine set 63 and/or containers from container set 64. It is understood that these VCEs may be stored as images and may be transferred among and between the various physical machine hosts, either as images or after instantiation of the VCE. Cloud orchestration module 61 manages the transfer and storage of images, deploys new instantiations of VCEs and manages active instantiations of VCE deployments. Gateway 60 is the collection of computer software, hardware, and firmware that allows public cloud 15 to communicate through WAN 12.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private Cloud 16 is similar to public cloud 15, except that the computing resources are only available for use by a single enterprise. While private cloud 16 is depicted as being in communication with WAN 12, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 15 and private cloud 16 are both part of a larger hybrid cloud.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The corresponding structures, materials, acts, and equivalents of all elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment and terminology were chosen and described in order to best explain the principles of the invention and the practical application, and to enable others of ordinary skill in the art to understand the invention for various embodiments with various modifications as are suited to the particular use contemplated.

What is claimed is:

1. A computer implemented recommender method comprising:
   accessing, by a user, via a remote computer system, an on-line recommender application used to generate recommendations on a given search topic or concept;
   selecting, by a hardware processor, based on a user profile information, a machine-learned recommender model for use by the recommender application to search web-based platforms and generate search results based on the given topic or concept, the selected recommender model responsive to an initial recommendation threshold parameter defining an initial search results boundary of content type generated when conducting an initial search query of the given topic or concept, said initial search results boundary based upon said user profile information, wherein content provided in response to search queries based on the initial recommendation threshold parameter comprise initial search results aligned with the user profile information;
   receiving, via an interface at the remote computer system, a spectrum range model parameter defining an expanded search results boundary of content type that includes diversified content beyond the types of content generated within the initial search results content boundary;
   running, at the hardware processor, the recommender model responsive to the spectrum range model parameter for conducting a search query and generating a halo of recommendation results, the generated halo of recommendation results comprising a search results dataset having an expanded and diversified content range for the given topic or concept to a degree based upon an application data set and the expanded search results boundary, said hardware processor subtracting, from the initial search results, generated results aligned with the user profile information that the user has already been exposed to, wherein said halo of recommendation results displays expanded and diversified content the user has not yet seen; and
   displaying, via the user interface of the remote computer system, the generated halo of recommendation results having the expanded and diversified content range generated by said recommender model that the user has not yet seen.

2. The computer-implemented method as claimed in claim 1, wherein the selecting a machine-learned recommender model for use by the recommender application is further based on a type of recommender application and a dataset to be searched.

3. The computer-implemented method as claimed in claim 1, wherein said initial recommendation threshold corresponds to a user profile interest characteristic.

4. The computer-implemented method as claimed in claim 1, further comprising:
   detecting, via the user interface of the remote computer system, one or more user interactions with the generated halo of recommendation dataset results generated by said recommender model;
   ascertaining, via the hardware processor, a desired user experience or a curiosity level of the user based on the user interactions with the generated halo of recommendation dataset results; and
   dynamically adjusting one or more of the initial recommendation threshold or spectrum range value to increase alignment of generated halo of recommendation dataset results with the desired user experience or the curiosity level of the user.

5. The computer-implemented method as claimed in claim 4, wherein said detecting, via the user interface of the remote computer system, one or more user interactions with the generated halo of recommendation dataset results comprises:
   passively detecting user selections of displayed links associated with generated halo of recommendation dataset results displayed.

6. The computer-implemented method as claimed in claim 4, wherein said detecting, via the user interface of the remote computer system, one or more user interactions with the generated halo of recommendation dataset results comprises:
   detecting a proactive user interaction in the form of received user responses to displayed queries provided to users to ascertain the user's experience associated with curiosity halo dataset results.

7. The computer-implemented method as claimed in claim 4, wherein said recommender model implements one or more similarity computation techniques.

8. A computer-implemented recommender system comprising:
   a hardware processor;
   a computer readable storage medium having program instructions embodied therewith, the program instructions executable by the hardware processor to cause the hardware processor to:
   access, by a user, via a remote computer system, an on-line recommender application used to generate recommendations on a given search topic or concept;
   select, based on a user profile information, a machine-learned recommender model for use by the recommender application to search web-based platforms and generate search results based on the given topic or concept, the selected recommender model responsive to an initial recommendation threshold parameter defining an initial search results boundary of content type generated when conducting an initial search query of the given topic or concept, said initial search results boundary based upon said user profile information, wherein content provided in response to search queries based on the initial recommendation threshold parameter comprise initial search results aligned with the user profile information;

receive, via an interface at the remote computer system, a spectrum range model parameter defining an expanded search results boundary of content type that includes diversified content beyond the types of content generated within the initial search results content boundary;

run the recommender model responsive to the spectrum range model parameter for conducting a search and generating a halo of recommendation results, the generated halo of recommendation results comprising a search results dataset having an expanded and diversified content range for the given topic or concept to a degree based upon an application data set and the expanded search results boundary, the program instructions executable by the hardware processor further configuring the hardware processor to:

subtract, from the initial search results, generated results aligned with the user profile information that the user has already been exposed to, wherein said halo of recommendation results displays expanded and diversified content the user has not yet seen; and display, via the user interface of the remote computer system, the generated halo of recommendation results having the expanded and diversified content range generated by said recommender model that the user has not yet seen.

9. The computer-implemented system as claimed in claim 8, wherein the program instructions executable by the hardware processor further configure the hardware processor to:

detect, via the user interface of the remote computer system, one or more user interactions with the generated halo of recommendation dataset results generated by said recommender model;

ascertain a desired user experience or curiosity level of the user based on the user interactions with the generated halo of recommendation dataset results; and dynamically adjust one or more of the initial recommendation threshold or spectrum range value to increase alignment of generated halo of recommendation dataset results with the desired user experience or curiosity level of the user.

10. The computer-implemented system as claimed in claim 9, wherein to detect, via the user interface of the remote computer system, one or more user interactions with the generated halo of recommendation dataset results, the hardware processor is further configured to:

passively detect user selections of displayed links associated with generated halo of recommendation dataset results displayed.

11. The computer-implemented system as claimed in claim 9, wherein to detect, via the user interface of the remote computer system, one or more user interactions with the generated halo of recommendation dataset results, the hardware processor is further configured to:

detect a proactive user interaction in the form of received user responses to displayed queries provided to users to ascertain the user's experience associated with curiosity halo dataset results.

12. The computer-implemented system as claimed in claim 8, wherein said recommender model implements one or more similarity computation techniques.

13. A computer program product comprising:

a computer readable storage medium having program instructions embodied therewith, the program instructions executable by a computer system to cause the computer system to:

access, by a user, via a remote computer system, an on-line recommender application used to generate recommendations on a given search topic or concept;

select, based on a user profile information, a machine-learned recommender model for use by the recommender application to search web-based platforms and generate search results based on the given topic or concept, the selected recommender model responsive to an initial recommendation threshold parameter defining an initial search results boundary of content type generated when conducting an initial search query of the given topic or concept, said initial search results boundary based upon said user profile information, wherein content provided in response to search queries based on the initial recommendation threshold parameter comprise initial search results aligned with the user profile information;

receive, via an interface at the remote computer system, a spectrum range model parameter defining an expanded search results boundary of content type that includes diversified content beyond the types of content generated within the initial search results content boundary;

run the recommender model responsive to the spectrum range model parameter for conducting a search query and generating a halo of recommendation results, the generated halo of recommendation results comprising a search results dataset having an expanded and diversified content range for the given topic or concept to a degree based upon an application data set and the expanded search results boundary, the program instructions further causing the computer system to:

subtract, from the initial search results, generated results aligned with the user profile information that the user has already been exposed to; and display, via the user interface of the remote computer system, the generated halo of recommendation results having the expanded and diversified content range generated by said recommender model that the user has not yet seen.

14. The computer program product as claimed in claim 13, wherein the program instructions further cause the computer system to:

detect, via the user interface of the remote computer system, one or more user interactions with the generated halo of recommendation dataset results generated by said recommender model;

ascertain a desired user experience or curiosity level of the user based on the user interactions with the generated halo of recommendation dataset results; and dynamically adjust one or more of the initial recommendation threshold or spectrum range value to increase alignment of generated halo of recommendation dataset results with the desired user experience or curiosity level of the user.

15. The computer program product as claimed in claim 14, wherein to detect, via the user interface of the remote computer system, one or more user interactions with the generated halo of recommendation dataset results, the program instructions further cause the computer system to:

passively detect user selections of displayed links associated with generated halo of recommendation dataset results displayed.

16. The computer program product as claimed in claim 14, wherein to detect, via the user interface of the remote computer system, one or more user interactions with the generated halo of recommendation dataset results, the program instructions further cause the computer system to:

detect a proactive user interaction in the form of received user responses to displayed queries provided to users to ascertain the user's experience associated with curiosity halo dataset results.

* * * * *